United States Patent
Iinuma et al.

(10) Patent No.: US 7,526,135 B2
(45) Date of Patent: Apr. 28, 2009

(54) IMAGE PROCESSING APPARATUS, IMAGE PROCESSING METHOD, PROGRAM, AND STORAGE MEDIUM

(75) Inventors: Osamu Iinuma, Kawasaki (JP); Shinichi Kato, Kawasaki (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 770 days.

(21) Appl. No.: 11/215,977

(22) Filed: Sep. 1, 2005

(65) Prior Publication Data

US 2006/0044636 A1    Mar. 2, 2006

(30) Foreign Application Priority Data

Sep. 2, 2004    (JP) .............................. 2004-255772

(51) Int. Cl.
    *G06K 9/36* (2006.01)
(52) U.S. Cl. ..................................... 382/232
(58) Field of Classification Search ................ 382/176, 382/180, 232, 239, 243, 253, 305–306; 358/1.16, 358/1.17, 1.18, 1.9, 538, 449; 715/204, 273
    See application file for complete search history.

(56) References Cited

U.S. PATENT DOCUMENTS

| | | | |
|---|---|---|---|
| 5,999,664 A | * | 12/1999 | Mahoney et al. ............ 382/305 |
| 6,256,108 B1 | * | 7/2001 | Dziesietnik et al. ......... 358/1.18 |
| 6,804,016 B2 | | 10/2004 | Hashimoto et al. ......... 358/1.13 |
| 7,019,864 B2 | * | 3/2006 | Delhoune et al. .......... 358/1.18 |
| 7,391,917 B2 | * | 6/2008 | Ohta et al. ................... 382/253 |
| 2002/0012453 A1 | | 1/2002 | Hashimoto et al. .......... 382/112 |

FOREIGN PATENT DOCUMENTS

JP    6-214923    8/1994

\* cited by examiner

*Primary Examiner*—Jose L Couso
(74) *Attorney, Agent, or Firm*—Fitzpatrick, Cella, Harper & Scinto

(57) ABSTRACT

An image processing apparatus includes an image composition unit configured to generate a composite image by compositing first and second images, a specification unit configured to specify a generation process of the first and second images, and a selection unit configured to select a compression parameter to compress the composite image based on the combination of the generation process of the first and second images specified by the specification unit. In addition, an image compression unit is configured to compress the composite image using the compression parameter selected by the selection unit. The image composition unit generates the composite image by compositing the first image regarded as a semitransparent image and the second image.

15 Claims, 12 Drawing Sheets

IMAGE PROCESSING APPARATUS, IMAGE PROCESSING METHOD, PROGRAM, AND STORAGE MEDIUM

FIELD OF THE INVENTION

The present invention relates to a compression technique for compressing a composite image.

BACKGROUND OF THE INVENTION

In recent years, cases that multi-functional peripherals are equipped in offices and copy shops are increasing. A multi-functional peripheral (MFP) is an image processing apparatus which has various functions from a scan function (to be referred to as "SCAN" hereinafter) to a print function (to be referred to as "PDL" hereinafter) and a transmission function (to be referred to as "SEND" hereinafter). The MFP normally adopts a unique compression (decompression) method so as to efficiently process image data and to reduce the image memory size.

More specifically, image data in "SCAN", "PDL", and "SEND" (scanned image data, PDL image data, and SEND image data) are compressed (decompressed) at their optimal compression parameters. For example, since the scanned image data includes many noise components of a scanner and image deterioration is not conspicuous even when a high compression ratio is selected, it is compressed using compression parameter for the high compression ratio so as to reduce the image memory size. On the other hand, since the PDL image data includes nearly no noise components unlike scanned image data, and image deterioration becomes considerably conspicuous if it is compressed by selecting the same high compression ratio as for scanned image data, it is compressed using compression parameter for a low compression ratio.

Furthermore, the MFP comprises an image composition function, and can generate a composite image when the user superposes a form image (scanned image data or PDL image data) stored in a storage unit in the MFP and newly input scanned image data or PDL image data.

Japanese Patent Laid-Open No. 6-214923 (US Patent Laid-Open No. 2002-0012453-A1) discloses a transmission technique which generates a composite image by compositing PDL image data and scanned image data using the image composition function of the MFP, compressing the composite image, and transmitting the compressed composite image to a host computer connected on the network.

However, the above patent reference 1 describes that the generated composite image is compressed and is then transmitted, but it does not describe about any selection procedure of a compression parameter upon compressing the composite image.

On the other hand, upon compressing composite image obtained by compositing scanned image data and PDL image data, for example, when compression parameter for a high compression ratio is selected in image compression, severe image deterioration occurs in the PDL image data portion of the composite image. Hence, upon compressing the composite image, it is an important issue to select an optimal compression parameter(compression ratio) in correspondence with image data to be composited in terms of image deterioration.

SUMMARY OF THE INVENTION

The present invention has been made in consideration of the above situation, and has as its object to avoid image deterioration caused by image compression by selecting an appropriate compression parameter(compression ratio) upon compressing a composite image generated by compositing a plurality of image data.

In order to achieve the above object, an image processing apparatus according to the present invention comprises the following arrangement. That is, an image processing apparatus, comprising:

image composition unit configured to generate a composite image by compositing first and second images;

checking unit configured to check for each image if each of the first and second images to be composited is a scanned image which is generated by scanning an image by a scanner, or a PDL image which is generated via an application and is described in a page description language;

selection unit configured to select a compression parameter (compression ratio) used to compress the composite image on the basis of a combination of the first and second images to be composited checked by the checking unit; and image compression unit configured to compress the composite image using the compression parameter selected by the selection unit.

According to the present invention, upon compressing a composite image generated by compositing a plurality of image data, image deterioration caused by image compression can be avoided by selecting an appropriate compression parameter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

<Arrangement of Image Processing System Which Can Use Image Composition Function>

Figure 1:
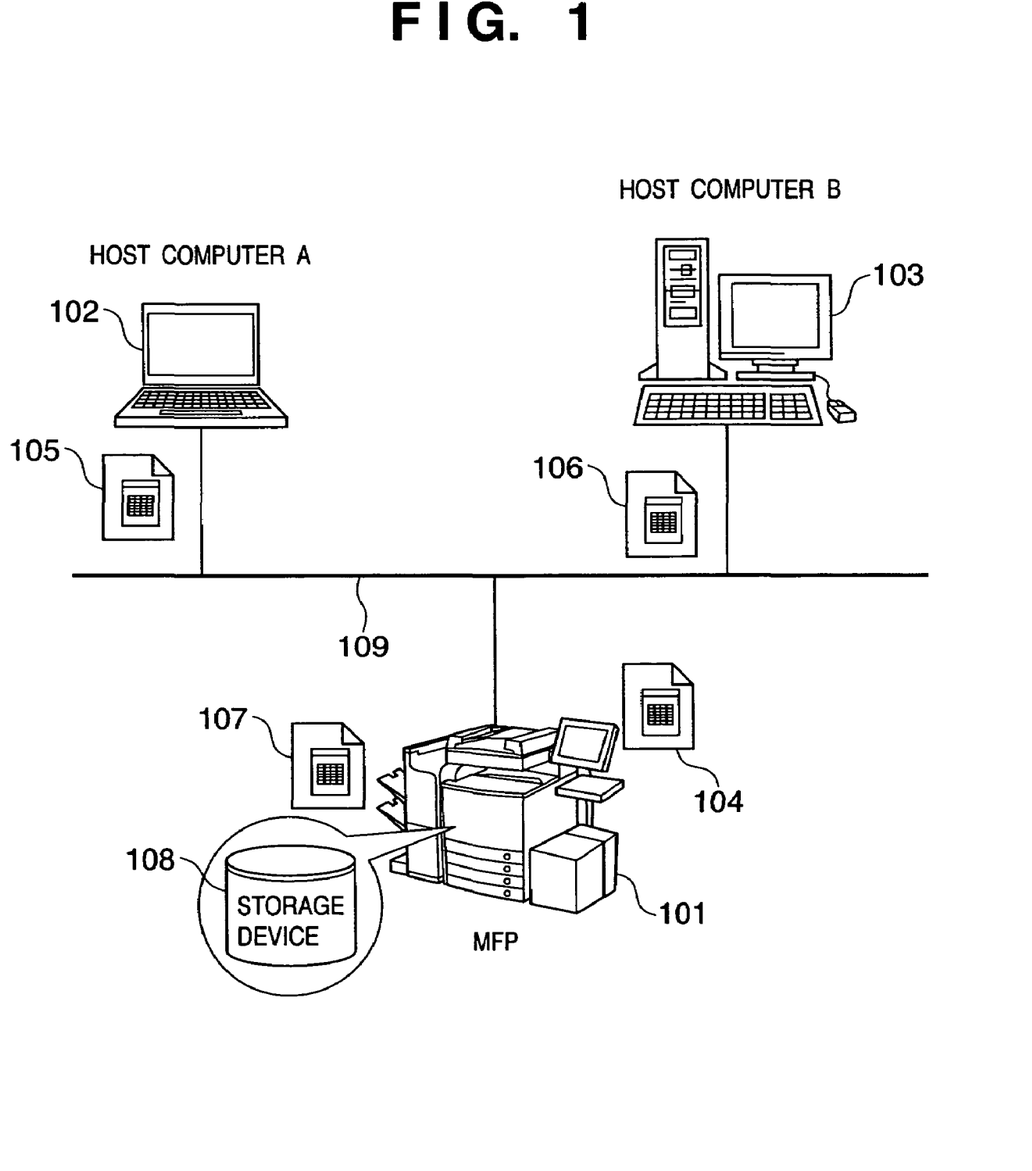
FIG. 1 is a diagram showing the overall arrangement of an image processing system which comprises an image processing apparatus (MFP) according to an embodiment of the present invention.

FIG. 1 is a diagram showing the overall arrangement of an image processing system which comprises an image processing apparatus (MFP 101) according to an embodiment of the present invention. Referring to FIG. 1, reference numeral 101 denotes an MFP which comprises an image composition function. Reference numerals 102 and 103 denote host computers (102: host computer A, 103: host computer B) which are connected to the MFP 101 via a network 109 to be able to communicate with each other. With this arrangement, the operation executed when the user uses the image composition function of the MFP 101 will be briefly described below.

Initially, the user registers image data 105 (PDL image data) from the host computer A or B (102, 103) in a storage device 108 in the MFP 101 as a "form image". The user then places an original 104 on a document table of the MFP 101 and scans the original 104 by operating a control panel to obtain an "original image" (scanned image data). Assume that the image data 105 registered in the storage device 108 is used as the form image upon image composition.

Note that the "form image" is image data which is registered in the MFP 101 in advance of those which are to be composited by the MFP 101, and the "original image" is image data input to the MFP 101 to be composited to the "form image". Also, the "PDL image data" is image data which is generated via an application installed in the host computer A or B (102, 103) and is described in a page description language (PDL), and the "scanned image data" is image data generated by scanning an image by "SCAN" of the MFP 101.

When the user makes settings required to output a composite image, an image composition process of the form image and original image is executed in the MFP 101 to generate a composite image 107, which is then printed out.

In the image processing system, as an output mode of the composite image 107, those other than the print output can be implemented. For example, the composite image 107 can be sent (by "SEND") to the host computer A (102) or host computer B (103) via the network 109. Also, the composite image 107 can be output to and stored in the storage device 108 in the MFP 101.

Also, in the MFP 101, the original image 104 to be composited to the form image 105 can be input by methods other than "SCAN". For example, image data 106 (PDL image data) which is received from the host computer A or B (102, 103) via the network 109 can be used as a original image, which is composited to the form image 105.

Furthermore, the MFP 101 registers the form image 105 via the host computer A or B (102, 103). However, the present invention is not particularly limited to this. For example, image data obtained by "SCAN" (scanned image data) can be registered in the storage device 108 as a form image.

<Overview of Image Composition Function of MFP>

Figure 2:
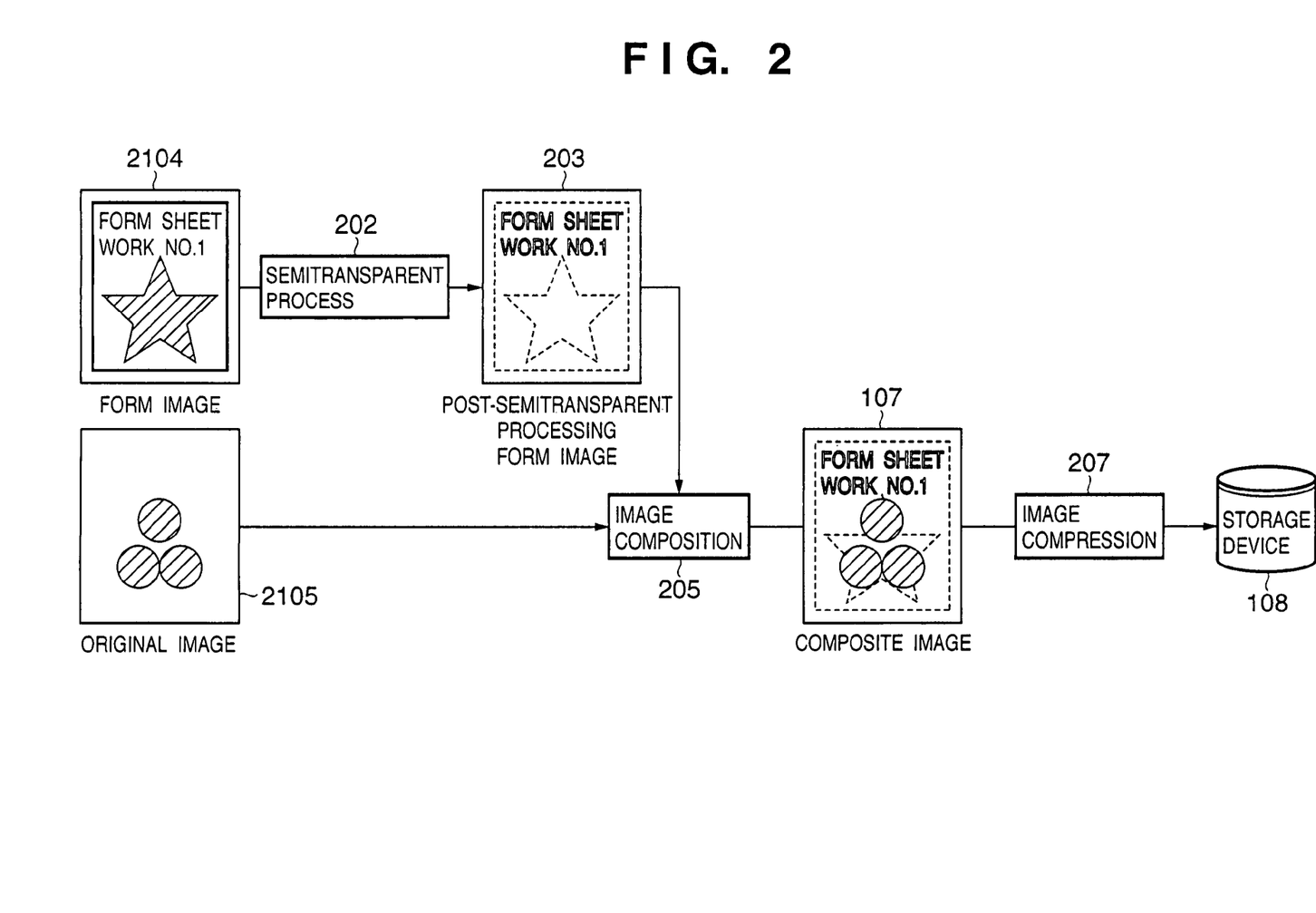
FIG. 2 is a diagram for explaining an overview of an image composition function of the MFP.
Figure 3:
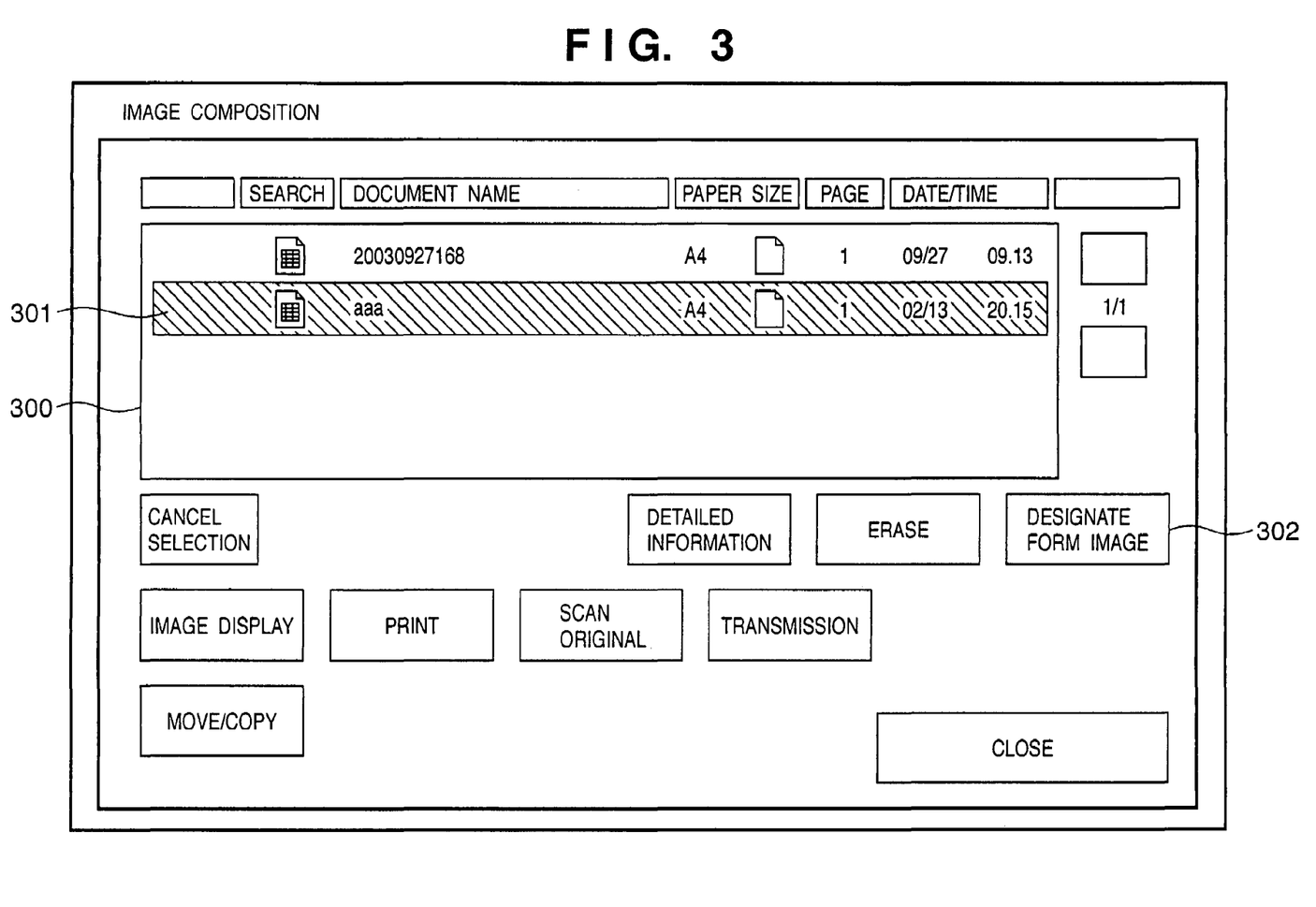
FIG. 3 shows an example of a user interface window of the MFP in the image composition process.
Figure 4:
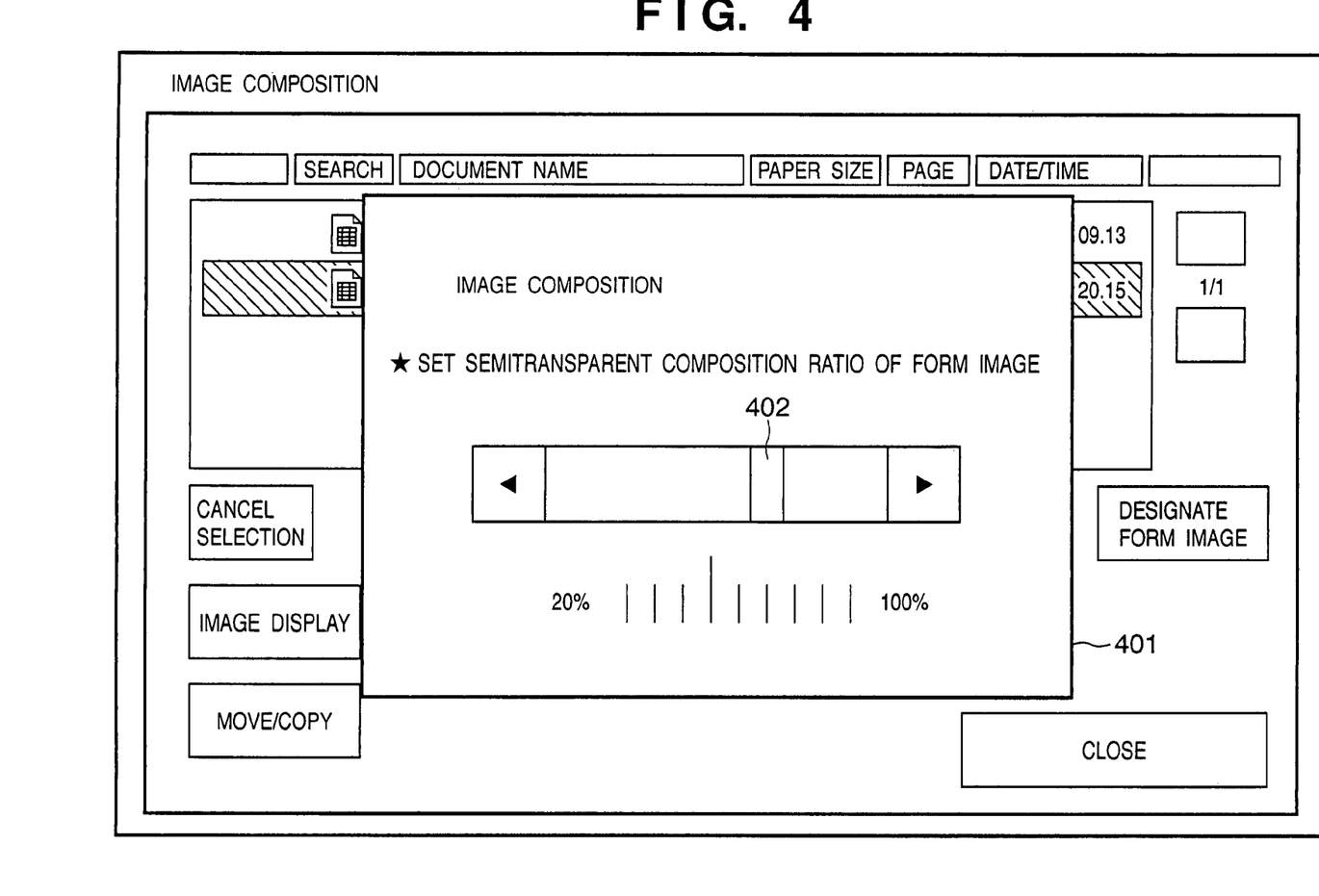
FIG. 4 shows an example of a user interface window of the MFP in the image composition process.

The image composition function of the MFP 101 will be described below using FIGS. 2 to 4. FIG. 2 is a diagram for explaining an overview of an image composition process by the image composition function of the MFP 101, and FIGS. 3 and 4 show examples of user interface windows of the MFP 101 in the image composition process.

Referring to FIG. 2, reference numeral 2104 denotes a form image; and 2105, an original image. Upon compositing the original image 2105 to the form image 2104 and outputting a composite image, the user selects a form image via the user interface window used to select a form image shown in FIG. 3. When the original image 2105 used in the image composition process is scanned by "SCAN", the user interface (FIG. 3) is displayed on the control panel of the MFP 101. When the original image 2105 used in the image composition process is sent to the MFP 101 via the host computer A or B (102, 103), the user interface is displayed on a monitor of the host computer A or B (102, 103).

The user interface window displays a list (300) of image data registered in the storage device 108. The user selects desired image data (301) from the list (300), and presses a button 302 to determine that the selected image data is used as the form image 2104. Also, upon registering image data in the storage device 108, the user designates image data to be registered as a form image, thus registering the image data as the form image 2104 in advance.

The determined form image 2104 undergoes a semitransparent process (density conversion or luminance conversion) (202) at a set semitransparent composition ratio to generate a post-semitransparent processing form image 203. FIG. 4 shows a user interface for setting the semitransparent composition ratio used in the semitransparent process, and a sub window 401 is displayed after the form image is determined upon depression of the button 302. As shown in the sub window 401 of FIG. 4, the user sets the semitransparent composition ratio using a slider bar 402.

The post-semitransparent processing form image 203 and original image 2105 are composited (205) to generate a composite image 107. The generated composite image 107 is compressed (207), and is stored in the storage device 108. Note that details of image compression will be described later.

<Type of Image Composition>

The MFP 101 can execute various composition methods. For example, the MFP 101 can execute multiply composition and add composition. Note that the multiply composition is a composition method which is given by:

$$\text{Output} = \text{Input} \times \text{Input} / 255 \qquad (1)$$

and is effective in image composition with the post-semitransparent processing form image 203.

Also, the add composition is a composition method which composites images by superposing the original image on the form image.

<Arrangement of Functional Blocks of MFP 101>

Figure 5:
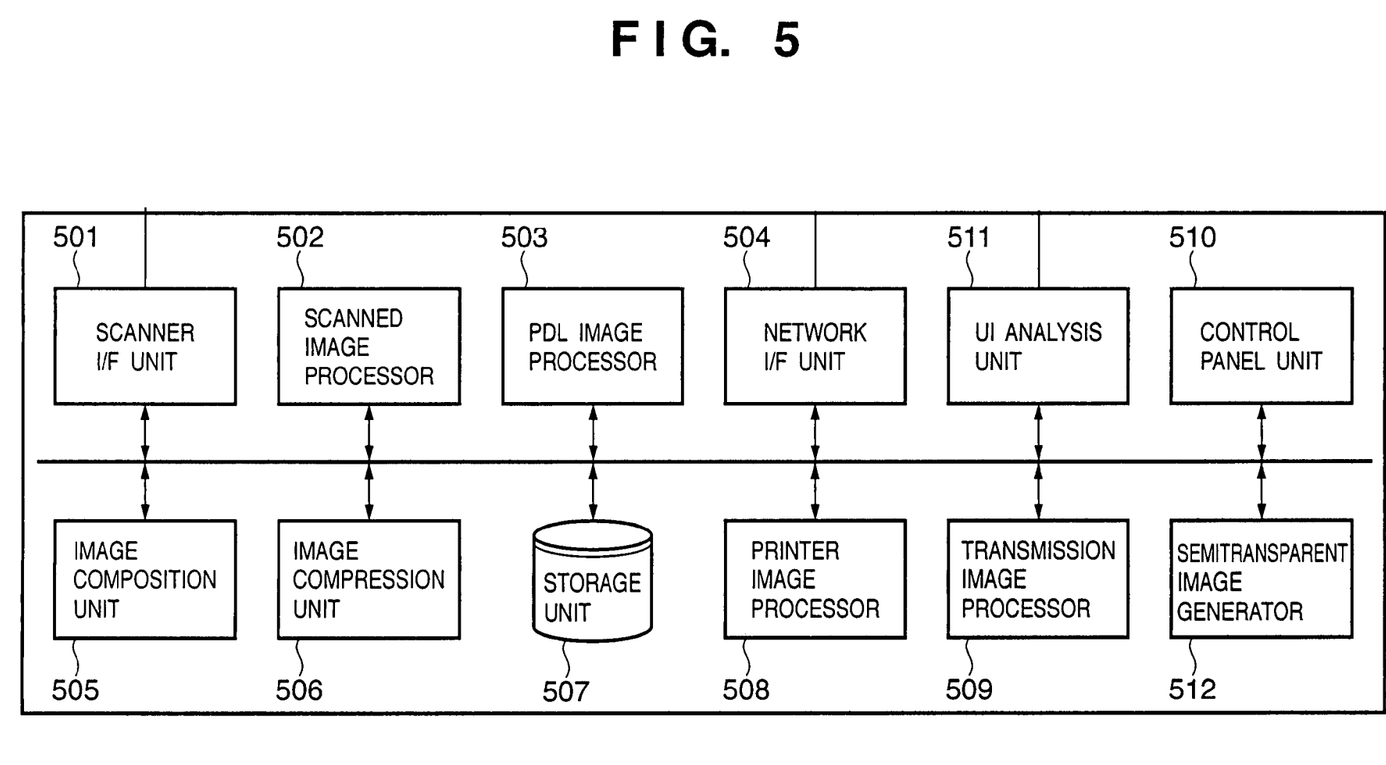
FIG. 5 is a block diagram showing the arrangement of functional blocks of the image processing apparatus (MFP) according to the embodiment of the present invention.

The arrangement of functional blocks of the MFP 101 will be described below. FIG. 5 is a block diagram showing the arrangement of functional blocks of the image processing apparatus (MFP 101) according to the embodiment of the present invention.

Note that the operations of respective blocks when PDL image data is registered as the form image 2104, and the original image 2105 obtained by "SCAN" is to be composited to the form image 2104 as an example of image composition will be described.

The PDL image data is received via a network I/F unit 504, and undergoes an appropriate image process by a PDL image processor 503. After that, the PDL image data is compressed by an image compression unit 506, and is then registered as the form image 2104 in a storage unit 507. After the form image 2104 is selected and the semitransparent composition ratio is set via a control panel unit 510, a UI analysis unit 511 analyzes the setting information.

Upon analyzing the setting information, the form image registered in the storage unit 507 is read out as compressed image data and is decompressed by the image compression unit 506, and a semitransparent image generator 512 then generates the post-semitransparent processing form image 203 according to the set semitransparent composition ratio.

After that, the post-semitransparent processing form image 203 is sent to an image composition unit 505. On the other hand, the original image 2105 obtained by "SCAN" undergoes an appropriate image process by a scanned image processor 502 via a scanner I/F unit 501, is then input to the image composition unit 505, and is composited to the post-semitransparent processing form image 203 generated in advance.

After the image composition, the composite image is compressed by the image compression unit 506, and is stored in the storage unit 507. The MFP 101 can temporarily save the compressed composite image in the storage unit 507 in that state. Furthermore, the saved composite image is decompressed by the image compression unit 506, undergoes an image process by a printer image processor 508, and is then printed out. Also, the decompressed image undergoes an image process by a transmission image processor 509, and is then transmitted.

<Arrangement of Image Compression Unit 506>

Figure 6:
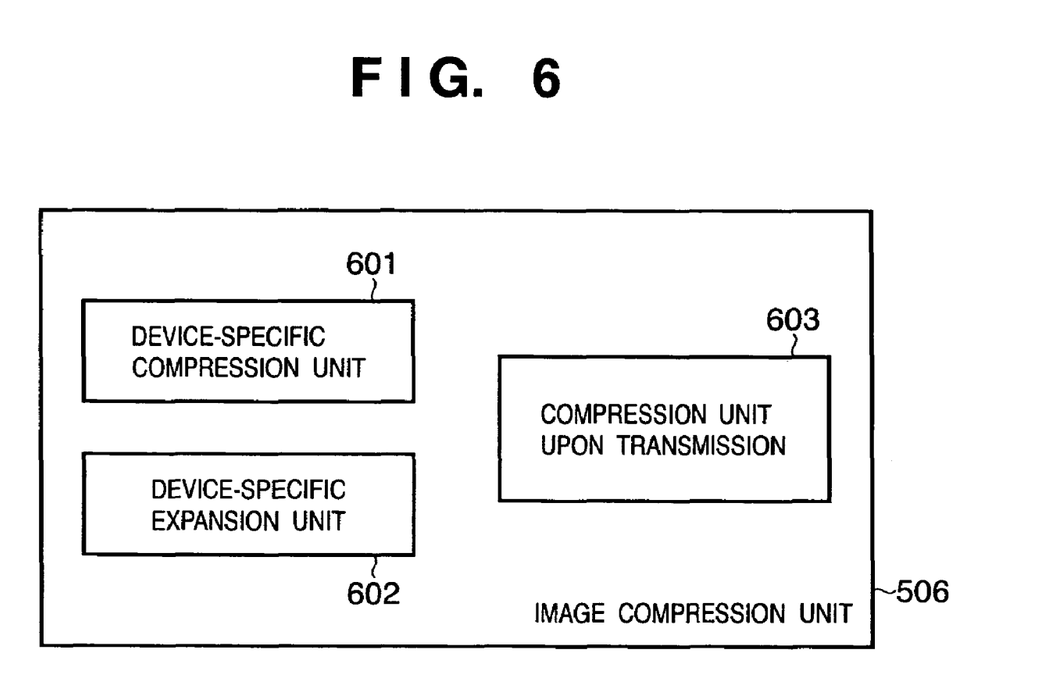
FIG. 6 is a functional block diagram showing details of an image compression unit.

FIG. 6 is a functional block diagram showing details of the image compression unit 506. Reference numerals 601 to 603 respectively denote a device-specific compression unit, a device-specific expansion unit, and a compression unit upon transmission. The device-specific compression unit 601 is compression means used when image data is saved in the storage unit 507 in the MFP 101, and uses a compression method unique to the MFP 101 on the ground of efficient use of memory resources in place of a general-purpose compression method. More specifically, the compression unit 601 segments an image into tiles, and can perform image compression for respective tiles using an appropriate compression parameter(compression ratio).

The device-specific expansion unit 602 is expansion means which expands an image compressed by the device-specific compression unit 601. The compression unit 603 upon transmission adopts JPEG compression well known as a color encoding method, and an image compressed by the unit 603 can be browsed by a viewer of an arbitrary host computer. The detailed arrangement of the device-specific compression unit 601 and expansion unit 602 will be described below.

The device-specific compression unit 601 comprises a compression block line buffer, encoder, and attribute flag encoder. The compression block line buffer segments an image into tiles (each tile size=M×N pixels). Then, the encoder can encode each tile (M×N pixels) separately by discrete cosine transformation encoding (JPEG) as an encoding method of color information and runlength encoding as encoding of attribute flag data information. Note that M and N must be integer multiples of a window size for discrete cosine transformation encoding. In the JPEG encoding method used in this embodiment, since the window size for compression is 8×8 pixels, for example, if M=N=32, a 32×32 pixel tile is further segmented into 16 8×8 pixel windows, and JPEG compression is applied for respective 8×8 pixels (the following description will be given under the assumption of M=N=32, but the present invention is not limited to such specific values).

The encoder quantizes 16 8×8 pixel windows included in a tile image of 32×32 pixels by applying known DCT transformation. Quantization coefficients (to be referred to as a quantization matrix hereinafter) used in this case can be selectively set for each tile (note that the aforementioned compression parameter indicates the quantization matrix in this embodiment). A switching signal is input to an attribute flag encoder.

In the attribute flag encoder, a determination unit executes a determination process with reference to attribute flag data of 32×32 pixels corresponding to the above image data, generates a selection signal of quantization coefficients, and outputs it to the encoder. The attribute flag data is appended to each pixel. However, since the encoding method in an M×N pixel tile is constant as in this embodiment, the determination unit must analyze attribute flag data in the tile to determine a representative attribute of the tile.

The device-specific decompression unit 602 will be described below. The device-specific decompression unit 602 comprises an attribute flag decoder, decoder, line buffer, and determination unit. When data for M×N pixels of the compressed and stored attribute flag data are read out, the attribute flag decoder decodes them. The decoder executes a decoding process of image data while switching a decoding parameter of the image data (a dequantization matrix in this embodiment) in accordance with the decoding result of the attribute flag data, and outputs the decoding result to the line buffer. At this time, attribute flag data are decoded, the determination unit executes analysis and determination process of the decoded attribute flag data in the M×N pixels, and the decoder sets a dequantization matrix required to decode the corresponding image data of M×N pixels upon decoding.

Since the attribute flag data are compressed by a lossless compression method such as runlength encoding free from any deterioration of data, the determination result for an identical tile upon encoding becomes equal to that upon decoding. Therefore, even when respective tiles are quantized using different quantization coefficients, dequantization coefficients suited to these tiles are set upon decoding. Hence, correct decoded image data can be obtained.

<Details of Image Compression Process of Composite Image>

Figure 7:
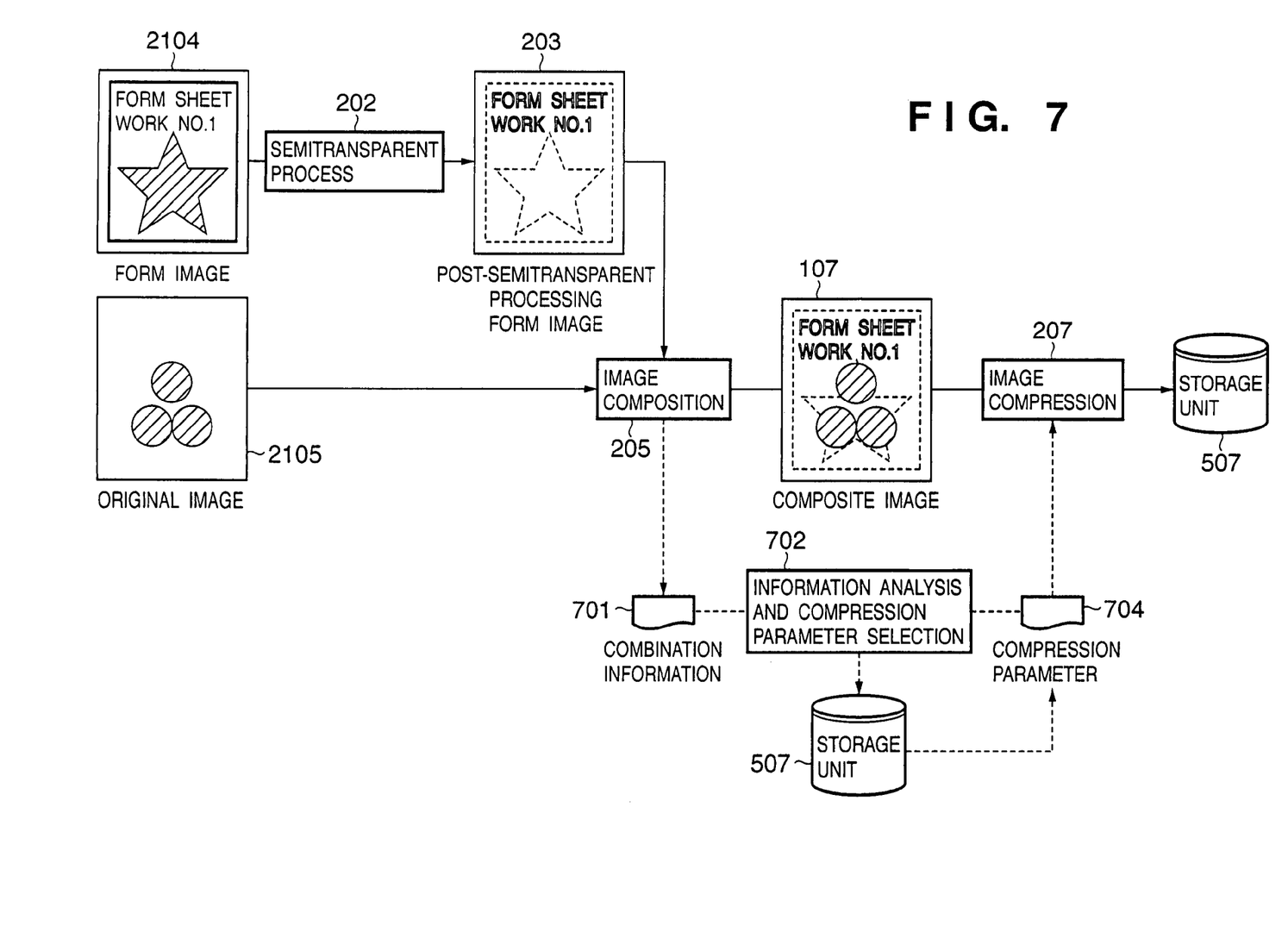
FIG. 7 is a diagram for explaining an overview of an image compression process in the MFP according to the first embodiment of the present invention.
Figure 8:
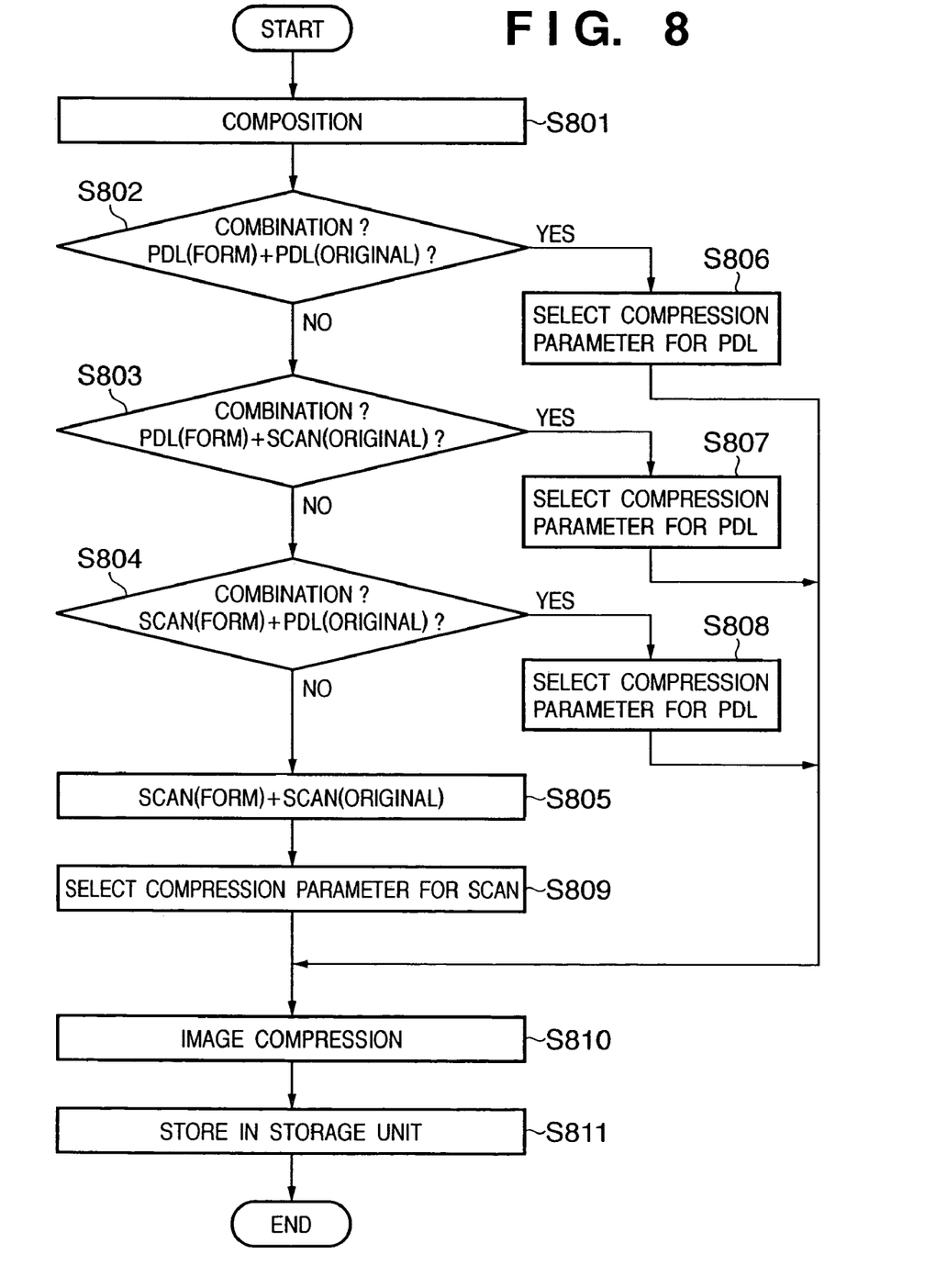
FIG. 8 is a flowchart showing the flow of the image compression process in the MFP according to the first embodiment of the present invention.

The operations of the respective blocks in FIG. 5 in the image compression process of the composite image will be described below using FIGS. 7 and 8. FIG. 7 is a diagram for explaining an overview of an image compression process in the MFP 101, and FIG. 8 is a flowchart showing the flow of the image compression process in the MFP 101.

In step S801, the image composition unit 505 performs image composition (205) using the post-semitransparent processing form image 203 generated by applying the semitransparent process (202) to the form image 2104, and the original image 2105. Upon image composition, the image composition unit 505 acquires combination information 701 used to determine if the post-semitransparent processing form image 203 and original image 2105 are respectively scanned image data or PDL image data. The acquired combination information 701 undergoes information analysis by the UI analysis unit 511 (702).

If both the post-semitransparent processing form image 203 and original image 2105 are PDL image data as a result of information analysis by the UI analysis unit 511 ("Yes" in step S802), the UI analysis unit 511 selects a compression parameter(compression ratio) 704 for PDL image data (702). The selected compression parameter 704 is read out from the storage unit 507, and is then set in the image compression unit 506 (step S806).

On the other hand, if "No" in step S802, the flow advances to step S803. If the post-semitransparent processing form image 203 is PDL image data and original image 2105 is scanned image data as a result of information analysis by the UI analysis unit 511 ("Yes" in step S803), the UI analysis unit 511 selects the compression parameter 704 for PDL image data (702). The selected compression parameter 704 is read out from the storage unit 507, and is then set in the image compression unit 506 (step S807).

If "No" in step S803, the flow advances to step S804. If the post-semitransparent processing form image 203 is scanned image data and original image 2105 is PDL image data as a result of information analysis by the UI analysis unit 511 ("Yes" in step S804), the UI analysis unit 511 selects the compression parameter 704 for PDL image data (702). The selected compression parameter 704 is read out from the storage unit 507, and is then set in the image compression unit 506 (step S808).

Finally, if none of the conditions in steps S802, S803, and S804 are met (i.e., if neither the post-semitransparent processing form image 203 nor the original image 2105 are PDL image data), it is determined that both the post-semitransparent processing form image and original image are scanned image data, and the UI analysis unit 511 selects a compression parameter 704 for scanned image data (702). Furthermore, the compression parameter 704 selected by the UI analysis unit 511 is read out from the storage unit 507, and is set in the image compression unit 506 (step S809).

In this way, in consideration of occurrence of image deterioration upon application of the compression parameter (compression ratio) for scanned image data to PDL image data, the MFP according to this embodiment selects the compression parameter for PDL image data in image compression when PDL image data is used as the original image or form image.

In step S810, the image compression unit 506 compresses the composite image using the compression parameter 704 selected as described above (207). Furthermore, in step S811 the compressed composite image is stored in the storage unit 507 (208).

As can be seen from the above description, the MFP according to this embodiment determines a compression parameter (compression ratio for scanned image data, and that for PDL image data) on the basis of the combination information (information associated with a combination of scanned image data and PDL image data) of two different types of image data (form image, original image) which are composited, upon compressing the composite image. Hence, image deterioration of the composite image, which may occur due to image compression, can be prevented. Upon determination of the compression parameter, since the compression parameter for PDL image data is used as far as possible, deterioration of the composite image can be avoided.

Second Embodiment

In the first embodiment, the compression parameter(compression ratio) is switched on the basis of the combination information 701. However, the present invention is not limited to this, and the compression parameter may be switched based on a semitransparent composition ratio in the image composition process. A detailed explanation will be given using FIGS. 9 and 10.

Figure 9:
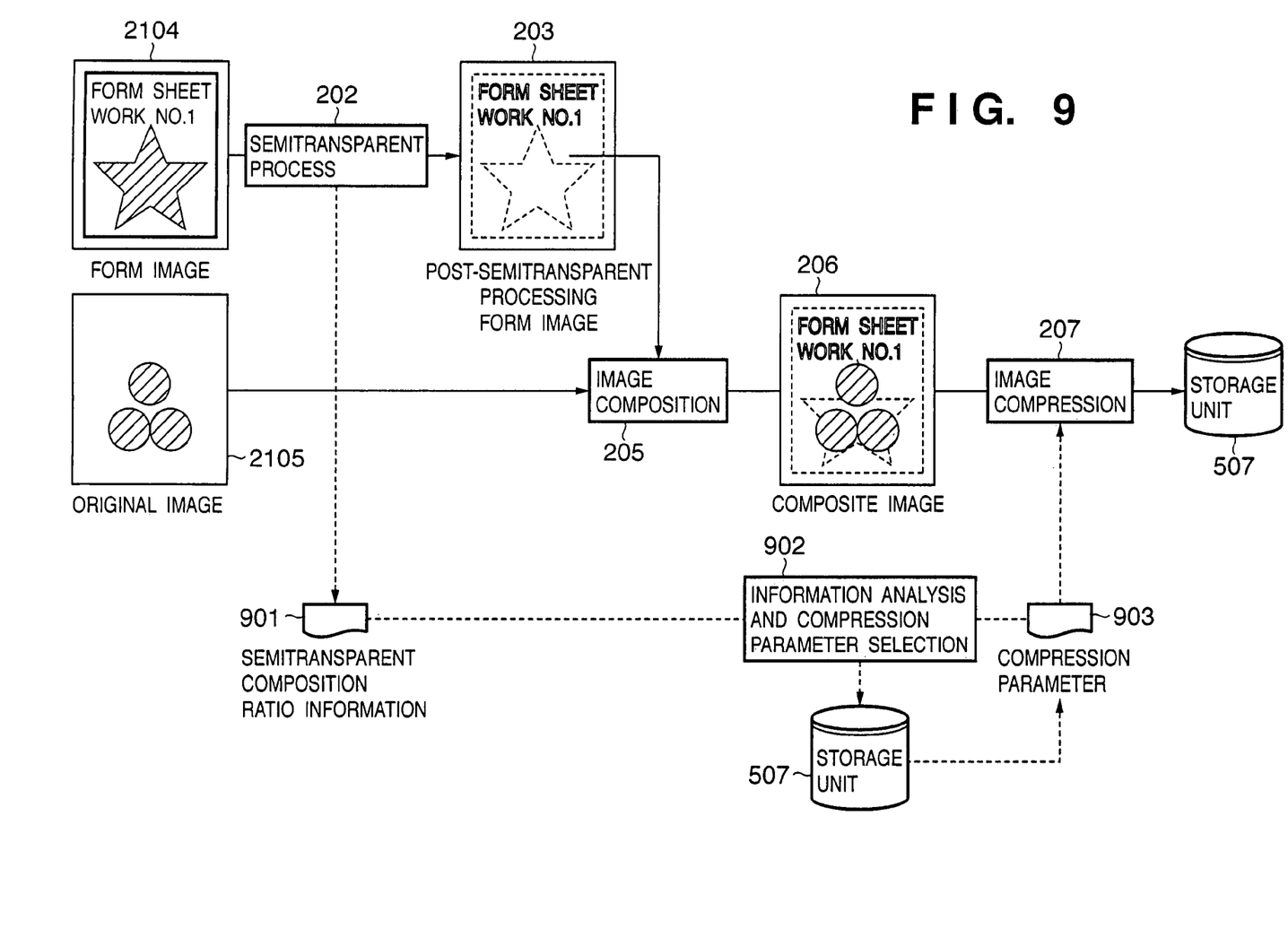
FIG. 9 is a diagram for explaining an overview of an image composition process and image compression process in the MFP according to the second embodiment of the present invention.
Figure 10:
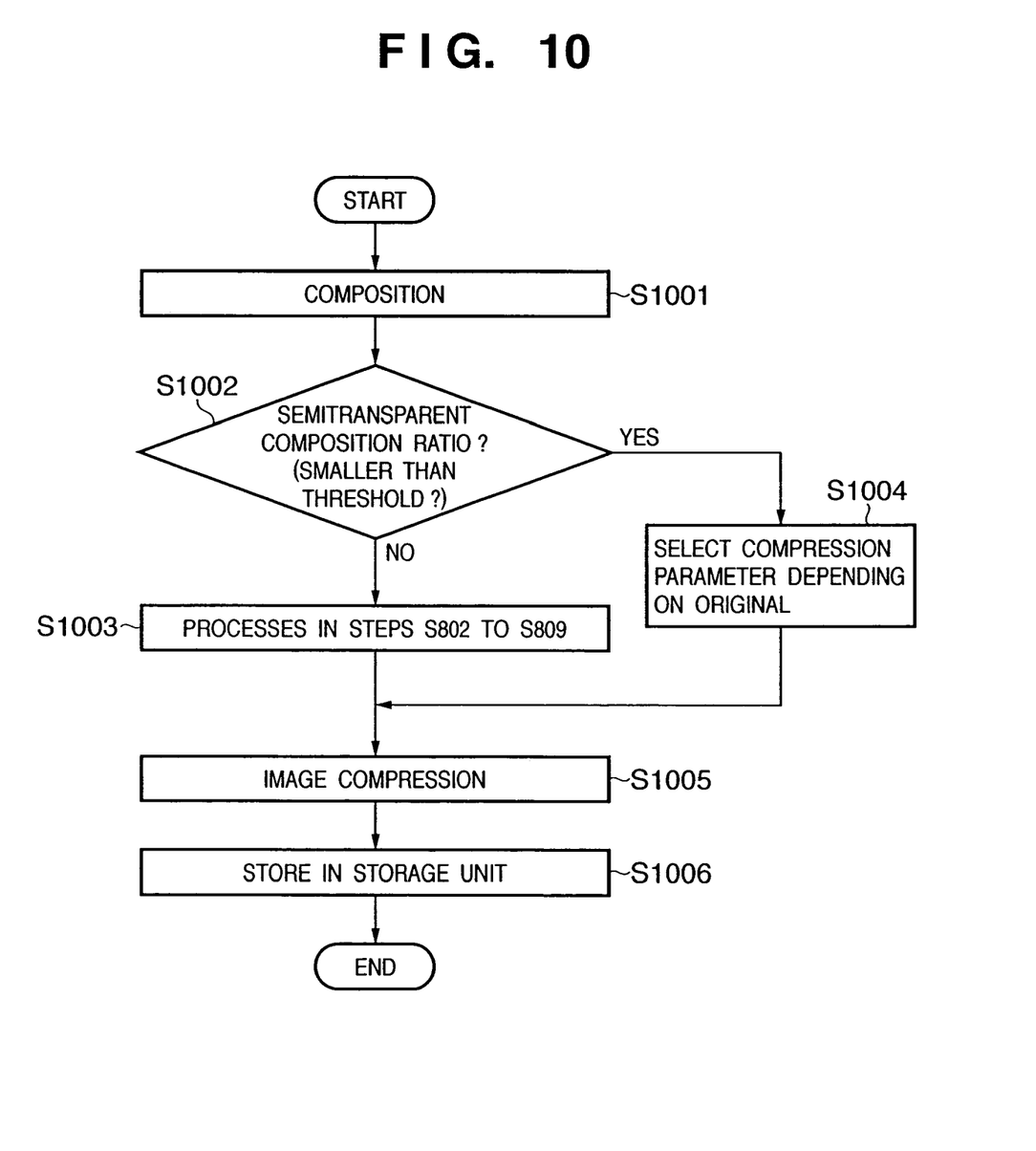
FIG. 10 is a flowchart showing the flow of the image composition process and image compression process in the MFP according to the second embodiment of the present invention.

FIG. 9 is a diagram for explaining an overview of an image composition process and image compression process in the MFP according to the second embodiment of the present invention, and FIG. 10 is a flowchart showing the flow of the image composition process and image compression process.

In step S1001, the image composition unit 505 composites the post-semitransparent processing form image 203 generated by applying the semitransparent process (202) to the form image 2104, and the original image 2105 (205). In step S1002, the UI analysis unit 511 compares semitransparent composition ratio information 901 set in image composition with a threshold of a semitransparent composition ratio set in advance by the user (902). The threshold of the semitransparent composition ratio is a value indicating the importance level of a form image set by the user, and is input via the control panel unit 510. When the threshold of the semitransparent composition ratio is low, the user does not attach an importance on the form image.

If the semitransparent composition ratio set by the user in image composition is smaller than its threshold as a result of comparison by the UI analysis unit 511 ("Yes" in step S1002), it is determined that the user does not attach an importance on the post-semitransparent processing form image 203, and the flow advances to step S1004 to select a compression parameter(compression ratio) 903 optimal to the original image 2105 from the storage unit 507 (the compression parameter for scanned image data in this case). Furthermore, in step S1005 the image compression unit 506 compresses the composite image 206 (207). After that, the compressed image is stored in the storage unit 507 (step S1006).

By contrast, if the semitransparent composition ratio set by the user in image composition is larger than its threshold as a result of comparison by the UI analysis unit 511 ("No" in step S1002), it is determined that the user attaches an importance on the post-semitransparent processing form image 203, and the flow advances to step S1003. In step S1003, a compression parameter 903 is selected in the same steps (steps S802 to S809) as in the first embodiment. In step S1005, the image compression unit 506 compresses the composite image 206 (207). After that, the compressed composite image 206 is stored in the storage unit 507 (step S1006).

As can be seen from the above description, the MFP according to this embodiment switches the compression parameter (compression parameter for scanned image data, that for PDL image data) using the semitransparent composition ratio upon image composition. Hence, image compression that reflects the importance level on the form image set by the user can be executed.

Third Embodiment

In the second embodiment, the compression parameter (compression ratio) is switched using the semitransparent composition ratio upon image composition. However, the present invention is not limited to this, and the compression parameter may be switched on the basis of a composite attribute flag which is generated at the same time upon image composition. A detailed explanation will be given hereinafter using FIGS. 11 and 12.

Figure 11:
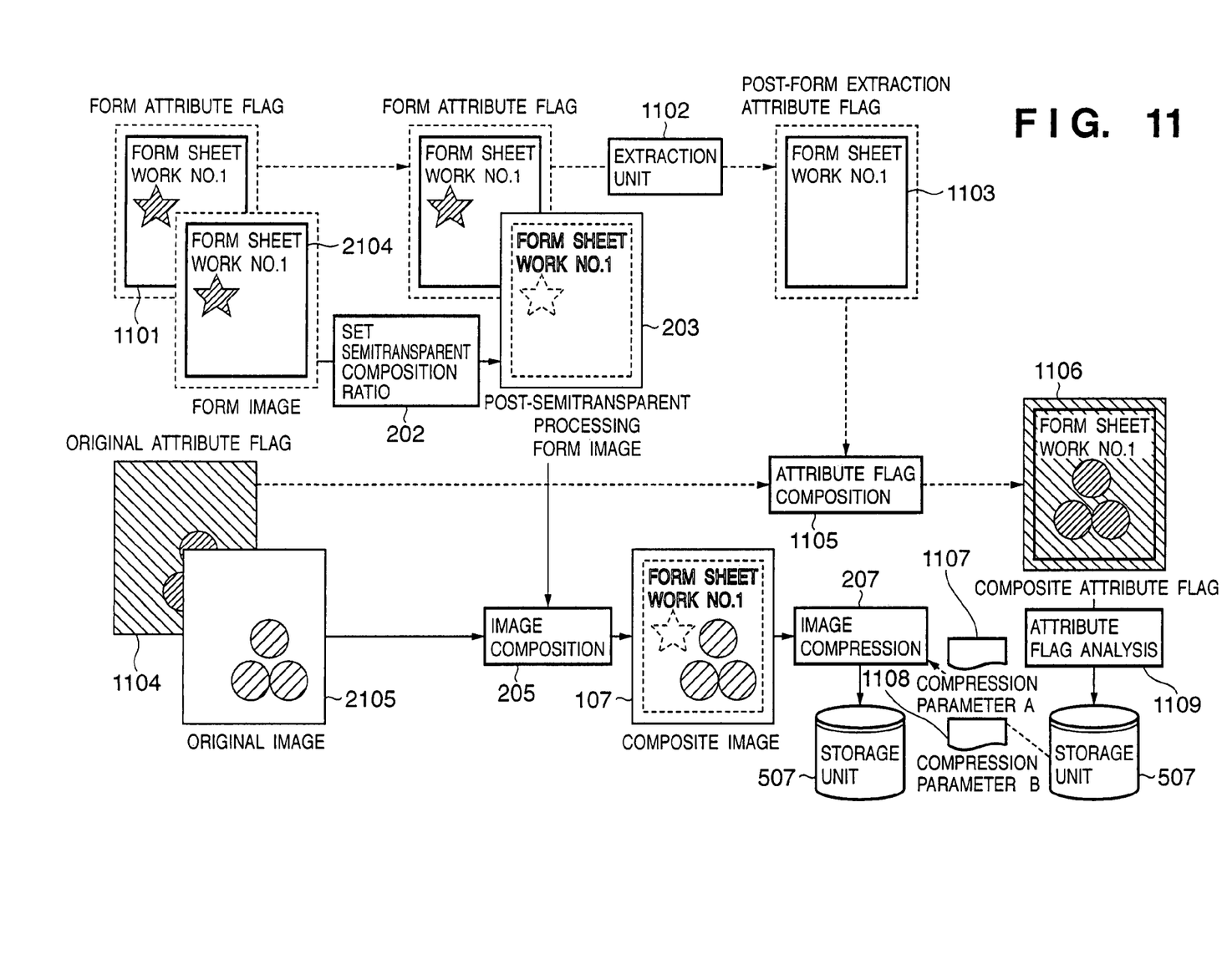
FIG. 11 is a diagram for explaining an overview of an image composition process and image compression process in the MFP according to the third embodiment of the present invention.
Figure 12:
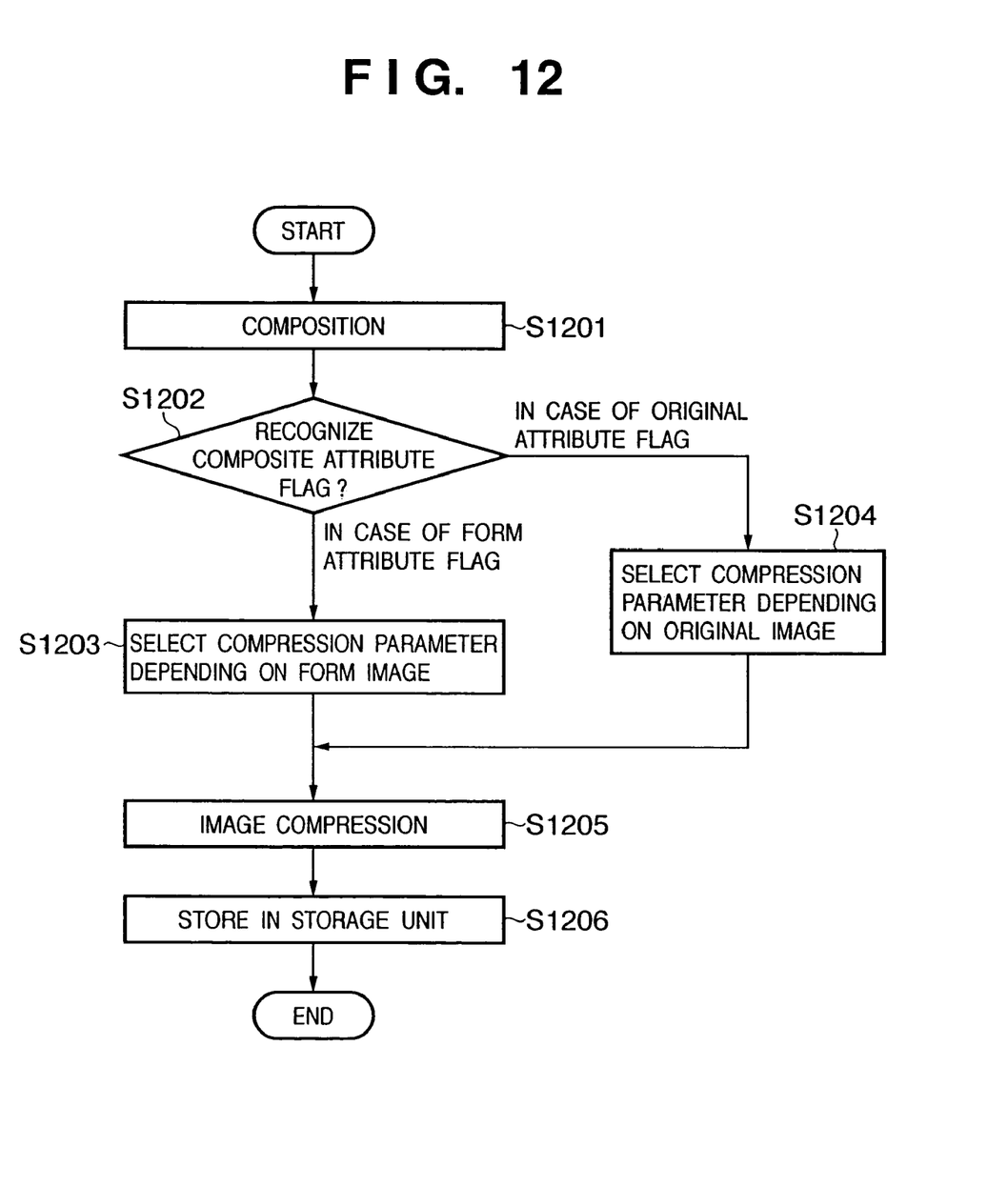
FIG. 12 is a flowchart showing the flow of the image composition process and image compression process in the MFP according to the third embodiment of the present invention.

FIG. 11 is a diagram for explaining an overview of an image composition process and image compression process in the MFP according to the third embodiment of the present invention, and FIG. 12 is a flowchart showing the flow of the image composition process and image compression process.

<Generation Method of Composite Attribute Flag>

A generation method of a composite attribute flag (form attribute flag and original attribute flag) will be described first using FIG. 11. Referring to FIG. 11, reference numeral 1101 denotes a form attribute flag as an attribute flag of the form image 2104; and 1104, a original attribute flag as an attribute flag of the original image 2105. Note that the "attribute flag" is attribute data used to identify attributes of respective areas that form an image, i.e., to identify if these areas correspond to a text part, photo part, graphics part, and so forth. The attribute flag is normally used to switch an image process in a print output process (for example, the image process is switched like image process A for the text part, image process B for the photo part, and image process C for the graphics part). However, in the MFP according to this embodiment, the composite attribute flag is generated, and is used to switch a compression parameter upon image compression.

Note that a case will be described below wherein the priority order is set so that a text part and thin line part of the form attribute flag 1101 are valid upon generation of the composite attribute flag (the priority order is set via the control panel unit 510).

The semitransparent image generator 512 extracts a predetermined attribute flag (text part and thin line part in this case) from the generated form attribute flag 1101 (1102), thus generating a post-form extraction flag 1103. The image composition unit 505 composites the post-form extraction flag 1103 and the original attribute flag 1104 (1105). At this time, the post-form extraction flag 1103 has top priority, and the original attribute flag 1104 is used as another attribute flag. As a result, a composite attribute flag 1106 is generated.

<Flow of Image Composition and Image Compression Processes>

The flow of the image composition and image compression processes will be described below using FIG. 12. In step S1201, the image composition unit 505 generates the composite image 107 and composite attribute flag 1106. In step S1202, the image compression unit 506 analyzes the composite attribute flag 1106 for respective areas (1109) to check if the attribute flag of the area of interest is the post-form extraction attribute flag 1103 or original attribute flag 1104.

If it is determined in step S1202 that the attribute flag of the area of interest is the post-form extraction attribute flag 1103, the flow advances to step S1203. Since the attribute flag of the area of interest is the post-form extraction attribute flag 1103, it is better to compress the area of interest using a compression parameter for PDL image data as a form image. Therefore, in step S1203 a compression parameter for PDL image data (compression parameter A (1107) in the example of FIG. 11) is selected, and is read out from the storage unit 507. Then, the compression parameter is set in the image compression unit 506.

On the other hand, if it is determined in step S1202 that the attribute flag of the area of interest is the original attribute flag 1104, the flow advances to step S1204. Since the attribute flag of the area of interest is the original attribute flag 1104, it is better to compress the area of interest using a compression parameter for scanned image data as a original image. Therefore, in step S1204 a compression parameter for scanned image data (compression parameter B (1108) in the example of FIG. 11) is selected, and is read out from the storage unit 507. Then, the compression parameter is set in the image compression unit 506.

In step S1205, the image compression unit 506 compresses the composite image 206 using compression parameters (1107 or 1108) set for respective areas (207). Furthermore, in step S1206 the compressed composite image is stored in the storage unit 507 (208).

As can be seen from the above description, in the MFP according to this embodiment, the compression parameter (compression parameter for scanned image data, that for PDL image data) of the composite image is switched for respective areas on the basis of the composite attribute flag generated upon image composition. Hence, the composite image can be compressed at an appropriate compression parameter.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-255772 filed on Sep. 2, 2004, which is hereby incorporated by reference herein.

What is claimed is:

1. An image processing apparatus, comprising:
an image composition unit configured to generate a composite image by compositing first and second images;
a specification unit configured to specify a generation process of the first and second images;
a selection unit configured to select a compression parameter to compress the composite image based on the combination of the generation process of the first and second images specified by said specification unit; and
an image compression unit configured to compress the composite image using the compression parameter selected by said selection unit,
wherein said image composition unit generates the composite image by compositing the first image regarded as a semitransparent image and the second image.

2. The apparatus according to claim 1, wherein said selection unit selects the compression parameter based on the combination of the generation process of the first and second images and a semitransparent composition ratio of the first image.

3. An image processing method, comprising:
an image composition step of generating a composite image by compositing first and second images;
a specification step of specifying a generation process of the first and second images;
a selection step of selecting a compression parameter to compress the composite image based on the combination of the generation process of the first and second images specified in said specification step; and
an image compression step of compressing the composite image using the compression parameter selected in said selection step,
wherein said image composition step generates the composite image by compositing the first image regarded as a semitransparent image and the second image, and
wherein each of said steps is performed on a computer.

4. A computer-readable medium embodying a control program for making a computer implement an image processing method comprising:
an image composition step of generating a composite image by compositing first and second images;
a specification step of specifying a generation process of the first and second images;
a selection step of selecting a compression parameter to compress the composite image based on the combination of the generation process of the first and second images specified in said specification step; and
an image compression step of compressing the composite image using the compression parameter selected in said selection step,
wherein said image composition step generates the composite image by compositing the first image regarded as a semitransparent image and the second image, and
wherein each of said steps is performed on a computer.

5. An image processing apparatus, comprising:
an image composition unit configured to generate a composite image by compositing first and second images;
a checking unit configured to check for each image if each of the first and second images to be composited is a scanned image which is generated by scanning an image by a scanner, or a PDL image which is generated via an application and is described in a page description language;
selection unit configured to select a compression parameter used to compress the composite image on the basis of a combination of the first and second images to be composited checked by said checking unit;
an image compression unit configured to compress the composite image using the compression parameter selected by said selection unit;
a semitransparent image generation unit configured to generate the first image as a semitransparent image by applying a semitransparent process using a predetermined semitransparent composition ratio; and
a comparison unit configured to compare the predetermined semitransparent composition ratio and a threshold set in advance, wherein
when said comparison unit determines that the predetermined semitransparent composition ratio is smaller than the threshold, said selection unit selects a compression parameter suited to compress the second image as the compression parameter used to compress the composite image.

6. The apparatus according to claim 5, wherein when neither the first image nor the second image to be composited are the PDL images, said selection unit selects a compression parameter that realizes higher image compression than a case wherein one of the first and second images to be composited is a PDL image.

7. The apparatus according to claim 5, further comprising a setting unit configured to set the threshold.

8. An image processing apparatus, comprising:
an image composition unit configured to generate a composite image by compositing first and second images;
an attribute generation unit configured to generate attribute information of respective areas which form the composite image using attribute information of respective areas which form the first image and attribute information of respective areas which form the second image on the basis of a priority order about the attribute information set in advance for respective areas;
a selection unit configured to select compression parameters used to compress the composite image on the basis of the attribute information of respective areas generated by said attribute generation unit; and
an image compression unit configured to compress the respective areas of the composite image using the compression parameters selected by said selection unit,
wherein said image composition unit generates the composite image by compositing the first image regarded as a semitransparent image and the second image.

9. The apparatus according to claim 8, further comprising a setting unit configured to set the priority order about the attribute information.

10. An image processing method, comprising:
an image composition step of generating a composite image by compositing first and second images;
a checking step of checking for each image if each of the first and second images to be composited is a scanned image which is generated by scanning an image by a scanner, or a PDL image which is generated via an application and is described in a page description language;
a selection step of selecting a compression parameter used to compress the composite image on the basis of a combination of the first and second images to be composited checked in the checking step;
an image compression step of compressing the composite image using the compression parameter selected in the selection step, a semitransparent image generation step of generating the first image as a semitransparent image by applying a semitransparent process using a predetermined semitransparent composition ratio; and a comparison step of comparing the predetermined semitransparent composition ratio and a threshold set in advance, wherein the selection step includes a step of selecting, when it is determined in the comparison step that the predetermined semitransparent composition ratio is smaller than the threshold, a compression parameter suited to compress the second image as the compression parameter used to compress the composite image. and wherein each of said steps is performed on a computer.

11. The method according to claim 10, wherein the selection step includes a step of selecting, when neither the first image nor the second image to be composited are the PDL images, a compression parameter that realizes higher image compression than to a case wherein one of the first and second images to be composited is a PDL image.

12. The method according to claim 11, further comprising a setting step of setting the threshold.

13. An image processing method, comprising:

an image composition step of generating a composite image by compositing first and second images;

an attribute generation step of generating attribute information of respective areas which form the composite image using attribute information of respective areas which form the first image and attribute information of respective areas which form the second image on the basis of a priority order about the attribute information set in advance for respective areas;

a selection step of selecting compression parameters used to compress the composite image on the basis of the attribute information of respective areas generated in the attribute generation step; and an image compression step of compressing the respective areas of the composite image using the compression parameters selected in the selection step, wherein said image composition step generates the composite image by compositing the first image regarded as a semitransparent image and the second image, wherein each of said steps is performed on a computer.

14. The method according to claim 13, further comprising a setting step of setting the priority order about the attribute information.

15. A computer-readable medium embodying a control program for making a computer implement an image processing method comprising:

an image composition step of generating a composite image by compositing first and second images;

a checking step of checking for each image if each of the first and second images to be composited is a scanned image which is generated by scanning an image by a scanner, or a PDL image which is generated via an application and is described in a page description language;

a selection step of selecting a compression parameter used to compress the composite image on the basis of a combination of the first and second images to be composited checked in the checking step;

an image compression step of compressing the composite image using the compression parameter selected in the selection step, a semitransparent image generation step of generating the first image as a semitransparent image by applying a semitransparent process using a predetermined semitransparent composition ratio; and a comparison step of comparing the predetermined semitransparent composition ratio and a threshold set in advance, wherein the selection step includes a step of selecting, when it is determined in the comparison step that the predetermined semitransparent composition ratio is smaller than the threshold, a compression parameter suited to compress the second image as the compression parameter used to compress the composite image, and wherein each of said steps is performed on a computer.

* * * * *